Feb. 18, 1969     H. DAVIES     3,428,293
HIGH PRESSURE VALVE WITH COOPERATING BEVELLED SEALING FACES
Filed Jan. 14, 1966

INVENTOR.
HAROLD DAVIES
BY
AGENT

INVENTOR.
HAROLD DAVIES

United States Patent Office 3,428,293
Patented Feb. 18, 1969

3,428,293
HIGH PRESSURE VALVE WITH COOPERATING BEVELLED SEALING FACES
Harold Davies, Morris Plains, N.J., assignor to Thiokol Chemical Corporation, Bristol, Pa., a corporation of Delaware
Filed Jan. 14, 1966, Ser. No. 520,772
U.S. Cl. 251—170   9 Claims
Int. Cl. F16k 15/08, 5/04, 25/00

ABSTRACT OF THE DISCLOSURE

The present invention relates to a valve for very high inlet pressure use which utilizes one or more detached, floating but retained rings which nest on cooperating bevelled faces to provide an effective seal for the flow from inlet to outlet. This valve is light in weight but very high sealing pressures are achieved because of the wedigng action of the rings.

The present invention relates to a valve and particularly relates to valves used in connection with high inlet fluid pressure.

One of the most serious problems experienced with valves for sealing very high pressures is that of providing a truly effective seal across the valve seat. The hard plastic seats often used in valves are not adequate at very high pressures because they deform severely under the extremely high unit pressures on the valve seats necessarily employed to prevent leakage.

Metal to metal seals are usually employed instead in order that these high unit pressures can be withstood but the structure involved is usually very heavy and complicated if adequate sealing is to be achieved. The present inventor has solved this problem in an effective manner by providing a practical, strong yet simple and relatively lightweight new structure employing one or more nested floating sealing rings and corresponding annular seats all of which are forced together on bevelled faces. This wedging action directly stresses the rings which can be made sufficiently robust in section to adequately handle the load and yet represent a lighterweight and simpler overall structure than previous valves for very high pressure use. The wedging effect creates great force in the rings which is applied to sealing at the faces.

It is, therefore, an object of the present invention to provide a new valve for high fluid pressures which provides for a metal to metal seal at the valve seats yet is relatively lightweight, strong and uncomplicated.

It is also an object of the present invention to provide a valve of the foregoing type which employs a floating ring or rings and wedging thereof to effect a fluid seal.

Other objects and advantages of the present invention will become apparent from the description which follows.

Figure 1:
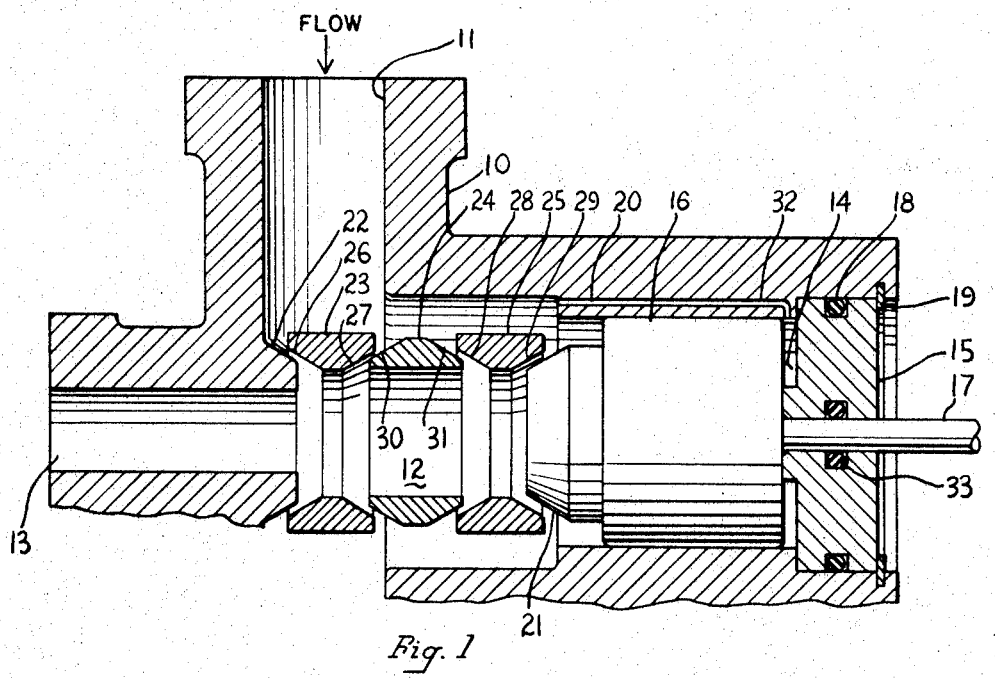
FIGURE 1 is a cutaway partial cross sectional view taken in elevation showing the interior of the valve in closed position.
Figure 2:
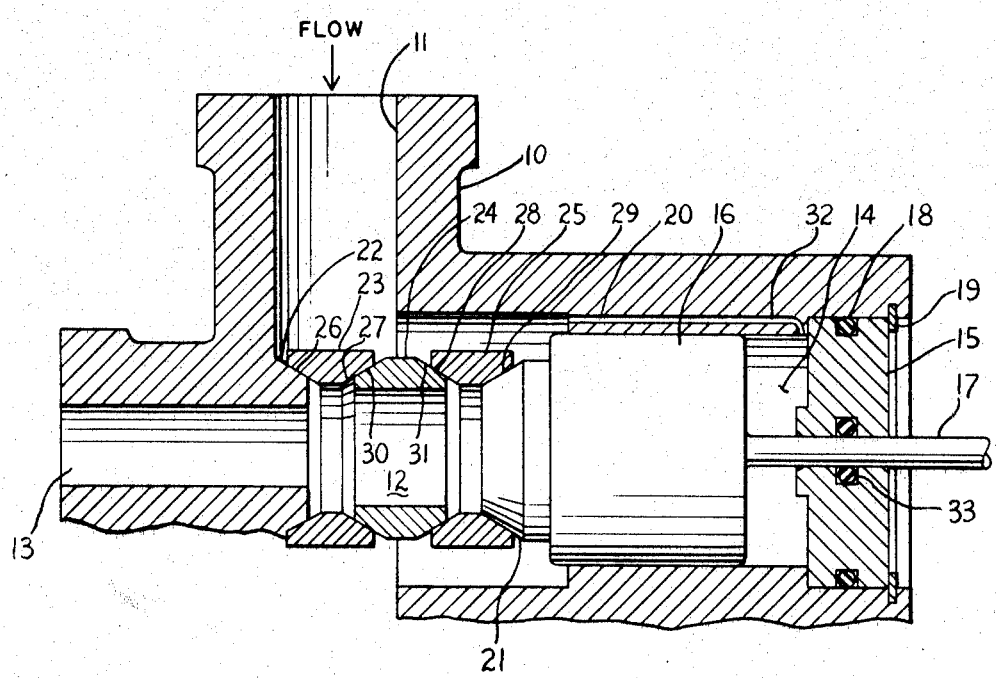
FIGURE 2 is a similar view showing the interior of the valve in open position.

With reference to FIGURES 1 and 2, a valve body 10 includes an inlet passage 11, and an outlet passage 13. Also included in body 10 is a cylindrical bore 14 closed at the right by an annular plug 15 and in which bore is slidably disposed a piston 16 having a piston rod 17 which extends out of body 10 through a suitable hole in plug 15 sealed by O-ring 33. Leakage about plug 15 is prevented by an O-ring seal 18 about its periphery and bearing against body 10 as shown and plug 15 is held in place securely by annular snap ring 19 or other suitable means (not shown). A vent pasage 20 is provided connecting the the space betwen piston 16 and plug 15 with inlet passage 11 and its function will be explained later.

It will now be apparent that piston 16 can be moved in bore or cylinder 14 to the left and right in FIGURES 1 and 2 from outside the valve by means of piston rod 17 which is in turn moved by manual, hydraulic or other suitable means (not shown).

Extending into chamber 12 from that end of piston 16 which is located in chamber 12, is a frustum of a right cone 21 having its central axis coincident with the central longitudinal axis of piston 16 in the manner shown. The conical side of cone 13 comprises a movable valve seat. At the left interior of chamber 12, and integral with valve body 10, is a stationary valve seat 22 which is also in the form of a frustum of a right cone having its central axis coincident with that of movable seat 21. Fluid outlet passage 13 extends through the center of seat 22 and communicates with chamber 12.

Disposed between seats 21 and 22 are three annular rings 23, 24 and 25. These are completely free of attachment to seals 21 and 22 and to each other but are retained by seats 21 and 22 by virtue of their width, diameter and faces as will be seen from the description which follows and from the drawings. Rings 23 and 25 have bevelled faces 26, 27, 28 and 29, respectively, on their inner surfaces in the manner shown while ring 24 has similar bevelled faces 30, 31 on its outer surface, also as shown. All of the rings have a central opening. It is intended that ring 23 be of such a diameter that when it is pushed toward seat 22, the bevelled face of ring 23 will bear upon the face of seat 22 and that, similarly ring 25 be of such a diameter (preferably the same as ring 23), that when it is pushed toward seat 21, its bevelled face will bear upon the face of seat 21. It is also intended that ring 24 should be of a smaller diameter than rings 23 and 25 but such that when rings 23 and 25 are moved toward it, its bevelled faces 30 and 31 bear upon the bevelled faces 27 and 28 of rings 23 and 25. All of the rings are of such width that with piston 16 moved all the way to the right in FIGURE 2 they will overlap each other and thus be losely retained between seats 21 and 22. This loose retention allows rings 23 and 25 to "hang" on seats 21 and 22 and ring 24, thus creating gaps between the seats through which the fluid is free to pass from inlet 11 into chamber 12 and then out of the valve body through passage 13. This is the "open" position of the valve shown in FIGURE 1.

With reference to FIGURE 2, however, it will be seen that movement of piston 16 to the left (towards the other seat) will cause rings 23 and 25 to bear upon their respective seats 22 and 21 and also upon ring 24 in the manner shown, the edges of side peripheries of the rings not contacting one another. With the rings tightly pressed together in this "nested" fashion, flow is effectively cut off since the gaps between the rings are now sealed by the bearing upon one another of the appropriate faces of the rings and the valve seats. This is the "closed" or shut-off position of the valve.

It will be apparent that piston 16 can be moved positively to the left or right either fully or partially by suitable means (not shown) external of the valve and acting through piston rod 17. Vent passage 32 is provided to relieve the pressure of any fluid trapped in chamber 14.

From the foregoing description it can be seen that the rings and seats can be made very strong by thickening their cross section and great pressure can easily be exerted upon them by piston 16 to effectively seal high fluid pressures. It should be noted that the width of rings 23 and 25 and their consequent area exposed to the high pressure fluid of the inlet is greater than the width of the exposed portion of ring 24. As a result of this, rings 23 and 25 have a greater compressive pressure load acting upon them than does ring 24 which causes rings 23 and 25 to press even more tightly on ring 24 to increase the sealing effect.

Figure 3:
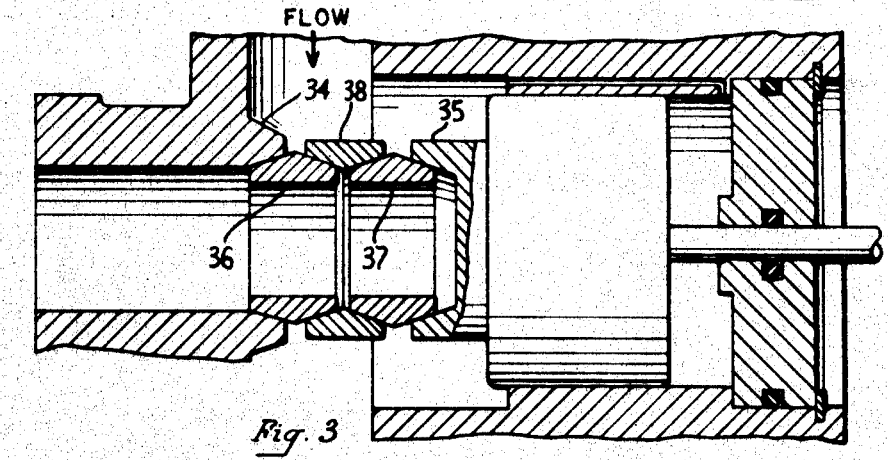
FIGURE 3 is a view similar to FIGURE 1 showing an alternate arrangement of the rings and sealing faces.

In FIGURE 3 is shown an alternate arrangement of the sealing faces of the rings in which the bevelled sealing faces are reversed from what they are in FIGURES 1 and 2. The bevelled sealing faces of the seats 34 and 35 are here shown internal of the seat, i.e., on the inner side as shown, and the mating or corresponding bevelled sealing faces of the rings 36 and 37 are external of the rings as shown. The bevelled sealing faces of center ring 38 are internal of that ring in order that they may mate with their corresponding surfaces on rings 36 and 37. Operation of this alternate arrangement is exactly similar to that of the arrangement shown in FIGURE 1. It should be noted, however, that the width of the ring 38 and its consequent area exposed to the high pressure fluid of the inlet is greater than the width of the exposed portion of each of rings 36 and 37 and their consequent exposed areas. As a result, ring 38 has a greater compressive pressure load acting upon it than do rings 36 and 37 which causes ring 38 to press tightly on rings 36 and 37 to help the sealing effect.

Figure 4:
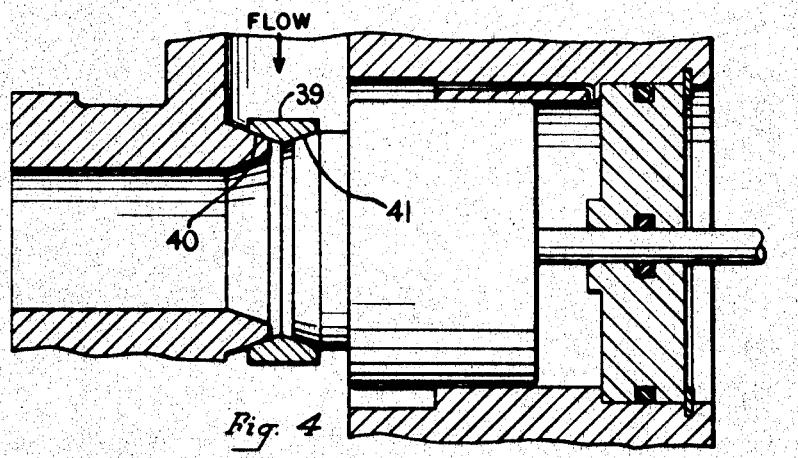
FIGURE 4 is a view similar to FIGURES 1 but showing the employment of a single floating ring.

In FIGURE 4, a single ring 39 is employed having internal bevelled faces, i.e., on its inner side as shown, mating with external faces on the fixed and movable seats 40 and 41. This arrangement operates substantially in the same manner as that shown in FIGURE 1 except that a single ring is employed.

Figure 5:
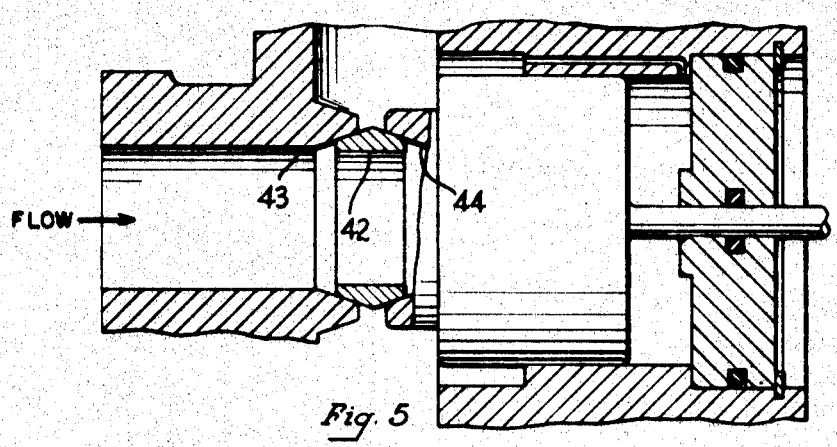
FIGURE 5 is a partial view similar to FIGURE 4 showing a single ring and an alternate arrangement of the bevelled sealing faces with the inlet and outlet reserved.

An alternate arrangement to FIGURE 4 is shown in FIGURE 5 wherein single ring 42 has external bevelled sealing faces which mate with internal bevelled sealing faces on each of seats 43 and 44. Again, this arrangement operates substantially in the same manner as that of FIGURE 4 except that the sealing faces are reversed and the fluid inlet and outlet passages are reversed.

While a single ring will operate satisfactorily, the employment of more than one ring gives more latitude in the event of misalignment and permits of larger manufacturing tolerances.

It is to be understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. A valve for pressurized fluids comprising a valve body having a fluid passage, a fixed annular seat at one side of said passage, a movable annular seat at the opposite side of said passage substantially co-axial with said fixed seat, at least one detached and floating ring interposed between said seats and supported by said seats, co-operating bevelled sealing faces on said ring and each seat, means for moving said movable seat toward or away from said fixed seat a distance less than the width of the ring whereby movement of the movable seat toward the fixed seat will cause the sealing faces of the ring to be forced onto the sealing faces of the fixed and movable seats to close the passage and prevent fluid flow and movement of the movable seat in the direction away from the fixed seat will cause gaps between the ring and seats to permit fluid flow.

2. The invention set forth in claim 1 with a plurality of rings interposed between said seats.

3. The invention set forth in claim 1 with the bevelled sealing faces being external of the annular seats and internal of the ring.

4. The invention set forth in claim 1 with the bevelled sealing faces internal of the annular seats and external of the ring.

5. The invention set forth in claim 4 with the pressurized fluid exposed to the internal side of the ring.

6. The invention set forth in claim 2 with three rings interposed between the annular seats, the bevelled sealing faces of the annular seats being external of the seats and the bevelled sealing faces of the rings adjacent the seats being internal of those rings, and the center ring of the three having its bevelled sealing faces external.

7. The invention set forth in claim 2 with three rings interposed between the annular seats, the bevelled sealing faces of the annular seats being internal of the seats and the bevelled sealing faces of the rings adjacent the seats being external of those rings, and the center ring of the three having its bevelled sealing faces internal.

8. The invention set forth in claim 7 with the center ring width greater than the portions of the other rings which are exposed to the pressurized fluid.

9. The invention set forth in claim 1 with the means for moving the movable annular seat comprising a piston slidable in a cylinder and attached to the movable seat, and means for moving the piston.

References Cited

UNITED STATES PATENTS

| | | | |
|---|---|---|---|
| 3,152,786 | 10/1964 | Soderberg | 251—167 |
| 2,374,195 | 4/1945 | Guarnaschelli | 251—190 |
| 2,970,804 | 2/1961 | Busby | 251—190 X |
| 3,033,237 | 5/1962 | Belford | 251—159 X |

CLARENCE R. GORDON, *Primary Examiner.*

U.S. Cl. X.R.

251—187, 190, 334; 137—628